(12) United States Patent
Weise et al.

(10) Patent No.: US 7,849,402 B2
(45) Date of Patent: Dec. 7, 2010

(54) INTERFACE AND METHOD FOR EXPLORING A COLLECTION OF DATA

(75) Inventors: Thomas Weise, Hohenroda (DE); Ruedger Rubbert, Berlin (DE)

(73) Assignee: XBranch Technologies GmbH, Berlin (DE)

( * ) Notice: Subject to any disclaimer, the term of this patent is extended or adjusted under 35 U.S.C. 154(b) by 1185 days.

(21) Appl. No.: 11/474,259

(22) Filed: Jun. 26, 2006

(65) Prior Publication Data

US 2006/0248455 A1 Nov. 2, 2006

Related U.S. Application Data

(63) Continuation of application No. 10/408,195, filed on Apr. 8, 2003, now Pat. No. 7,188,308.

(51) Int. Cl.
*G06F 17/21* (2006.01)
(52) U.S. Cl. ................. 715/234; 715/200; 715/230; 715/775
(58) Field of Classification Search ............ 715/200, 715/230, 234, 775
See application file for complete search history.

(56) References Cited

U.S. PATENT DOCUMENTS

| | | | | |
|---|---|---|---|---|
| 5,963,965 A | * | 10/1999 | Vogel | ............... 715/236 |
| 5,974,572 A | | 10/1999 | Weinberg et al. | |
| 5,991,751 A | | 11/1999 | Rivette et al. | |
| 6,055,515 A | * | 4/2000 | Consentino et al. | ........ 705/27 |
| 6,381,607 B1 | * | 4/2002 | Wu et al. | ............... 707/100 |
| 6,466,918 B1 | | 10/2002 | Spiegel et al. | |
| 6,484,149 B1 | * | 11/2002 | Jammes et al. | ............. 705/26 |
| 6,499,036 B1 | * | 12/2002 | Gurevich | ............. 707/103 R |

(Continued)

OTHER PUBLICATIONS

Animated Exploration of Graphs with Radial Layout PDF document downloaded from http://zesty.ca/pubs/infovis-2001-submit.pdf.
Information Visualization—PDF document downloaded from http://www.cs.umd.edu/~bederson/classes/hci/lecture-notes/infoviz.pdf.
TaxonTree: Visualizing Biodiversity Information—PDF downloaded from ftp://ftp.cs.umd.edu/pub/hcil/Reports-Abstracts-Bibliography/2003-40html/2003-40.pdf.

*Primary Examiner*—Joshua D Campbell
(74) *Attorney, Agent, or Firm*—Bracewell & Giuliani LLP

(57) ABSTRACT

An interface and a method is provided for permitting a user to explore a collection of data. The data collection provides nodes as structural elements, and references which are assigned to nodes and hold the address of another node. Multiple references can be assigned to each node, thus guiding a user of the system to multiple other nodes, and multiple references can hold the same address, so that multiple nodes can have references pointing to the same node. The interface allows visualizing the network created by the interconnection of the nodes on a display region. The interface also allows the user to intuitively navigate along the references in both directions of the references, so that the user can explore which nodes are referenced by a certain node, and also by which nodes a certain node is referenced. Electronic documents can be assigned to each node, and the interface allows these documents to be displayed either directly in a reserved display region of the interface, or by launching a matching application on the user's computer.

24 Claims, 8 Drawing Sheets

U.S. PATENT DOCUMENTS

| | | |
|---|---|---|
| 6,529,900 B1 | 3/2003 | Patterson et al. |
| 6,532,457 B1 | 3/2003 | Tal et al. |
| 6,642,946 B1 * | 11/2003 | Janes et al. ................ 715/854 |
| 6,868,525 B1 * | 3/2005 | Szabo ........................ 715/738 |
| 2002/0059272 A1 * | 5/2002 | Porter ........................ 707/100 |
| 2002/0129017 A1 * | 9/2002 | Kil et al. ........................ 707/6 |

* cited by examiner

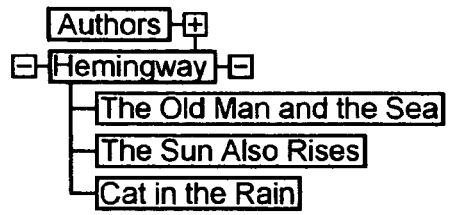
FIG. 11
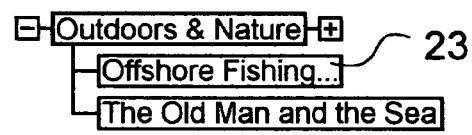
FIG. 12
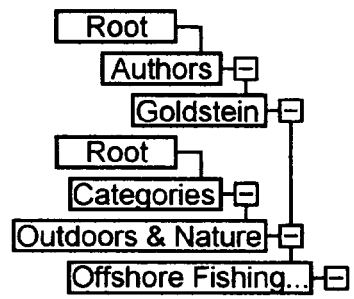
FIG. 13
| Index | Ref_Ix | Node_ID | Name | Doc_ID | UD | Ref_ID | Refs | Level |
|---|---|---|---|---|---|---|---|---|
| (0) | -1 | 1 | Root | <EMPTY> | D | -1 | 1 | 0 |
FIG. 15
| Index | Ref_Ix | Node_ID | Name | Doc_ID | UD | Ref_ID | Refs | Level |
|---|---|---|---|---|---|---|---|---|
| (0) | -1 | 1 | Root | <EMPTY> | D | -1 | 1 | 0 |
| (1) | 0 | 3 | Authors | <EMPTY> | D | 213 | 1 | 1 |
| (2) | 0 | 8 | Categories | <EMPTY> | D | 289 | 1 | 1 |
FIG. 16

FIG. 14

```
Public Type strucTreeData
    Public Ref_Ix As Long
    Public Node_ID As String * 38
    Public Name As String
    Public Doc_ID As String * 38
    Public UD As Char
    Public Ref_ID As Long
    Public Refs As Integer
    Public Level As Long
End Type Global uTreeRep() as strucTreeData
```

| Index | Ref_Ix | Node_ID | Name | Doc_ID | UD | Ref_ID | Refs | Level |
|---|---|---|---|---|---|---|---|---|
| (0) | -1 | 1 | Root | <EMPTY> | D | -1 | 1 | 0 |
| (1) | 0 | 3 | Authors | <EMPTY> | D | 213 | 1 | 1 |
| (2) | 0 | 8 | Categories | <EMPTY> | D | 289 | 1 | 1 |
| (3) | 2 | 9 | Novels | <EMPTY> | D | 459 | 1 | 2 |
| (4) | 2 | 39 | Outdoors & N. | <EMPTY> | D | 677 | 1 | 2 |
| (5) | 2 | 42 | Short Stories | <EMPTY> | D | 679 | 1 | 2 |

FIG. 17

| Index | Ref_Ix | Node_ID | Name | Doc_ID | UD | Ref_ID | Refs | Level |
|---|---|---|---|---|---|---|---|---|
| (0) | 1 | 3 | Authors | <EMPTY> | U | 213 | 2 | 1 |
| (1) | -1 | 7 | Hemingway | <EMPTY> | C | 456 | 3 | 2 |
| (2) | 1 | 14 | The Old Man.. | 8742399 | D | 681 | 0 | 3 |
| (3) | 1 | 17 | The Sun Also. | 9834709 | D | 711 | 0 | 3 |
| (4) | 1 | 35 | Cat in the R... | 8693457 | D | 752 | 0 | 3 |

FIG. 18

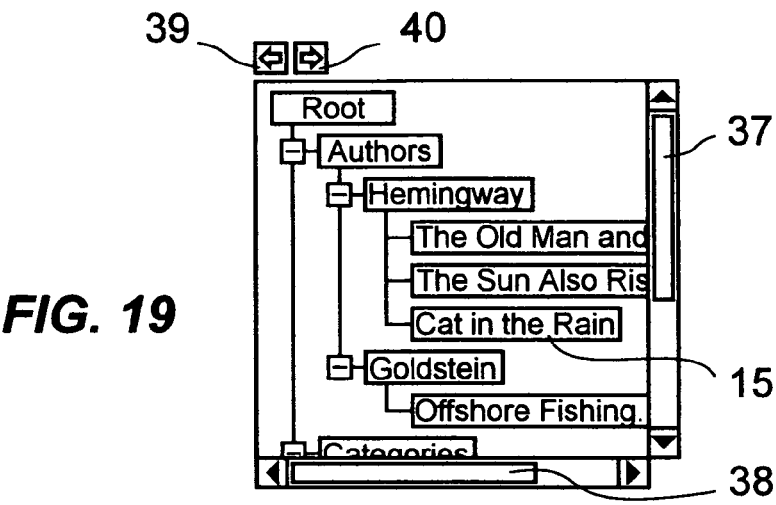
*FIG. 19*
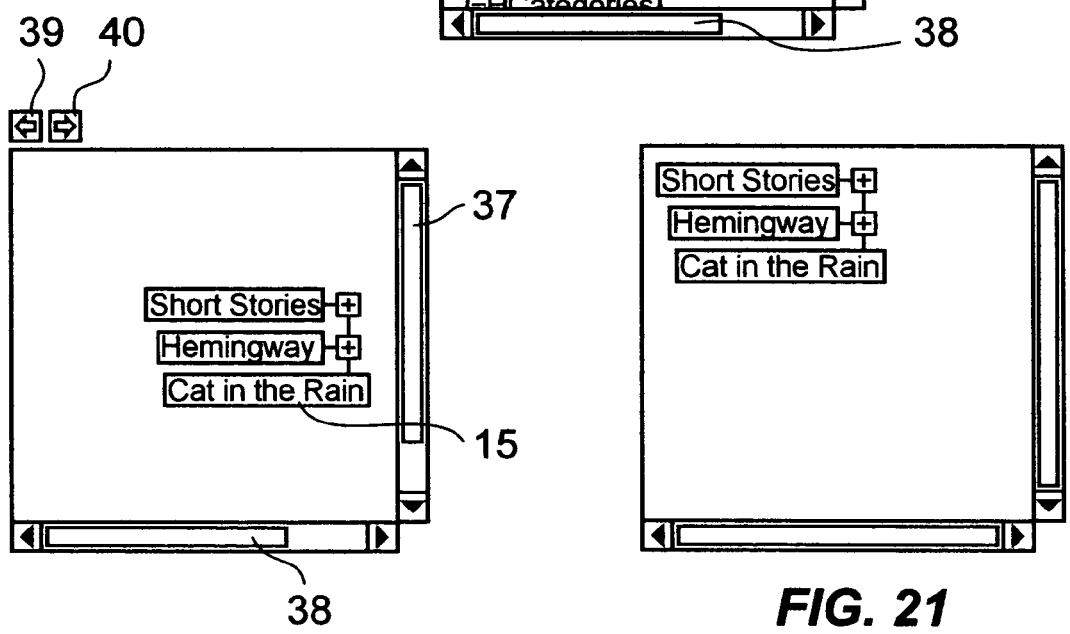
*FIG. 20*
*FIG. 21*
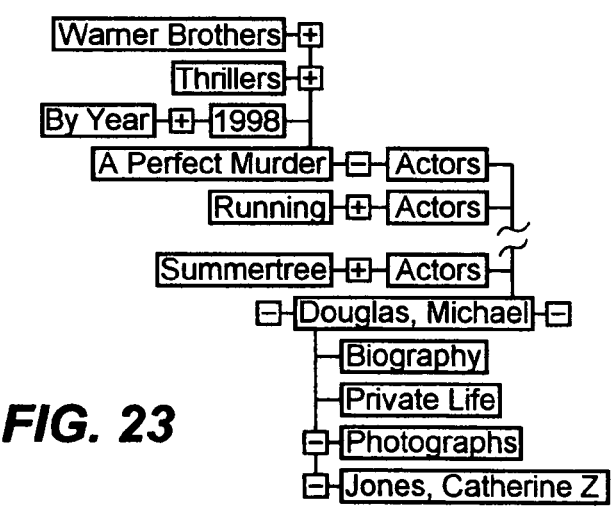
*FIG. 23*

INTERFACE AND METHOD FOR EXPLORING A COLLECTION OF DATA

CROSS-REFERENCE TO RELATED APPLICATIONS

This application is a continuation of Ser. No. 10/408,195, filed Apr. 8, 2003

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to an interface and a method allowing a user to intuitively explore and navigate within a collection of data. The invention is particularly suited for use with computer programs.

Over the last decades, the way information is stored and managed has dramatically changed. For centuries, information was stored in physical libraries. Librarians administered the inventory, and only few people had access. Nowadays, the increasing use of electronic storage systems makes it easy and cheap to store all kind of information. Huge databases hold millions of documents. Depending on the operating efficiency of the database server, any desired document can be made available within fractions of a second. Furthermore, the computer systems connected to the Internet provide a steadily growing number of documents. A new problem has arisen, and that is finding the desired information.

On computers, documents are typically stored in a file system. A file system can be organized in folders, each folder having further subfolders, if desired. Such a hierarchical organization can be visualized using tools like for instance the Windows® Explorer (produced and distributed as part of the operating system Windows by Microsoft Corp., Seattle, Wash., USA). This software has a graphical user interface (GUI) that is often referred to as a tree structure, allowing the user to expand or collapse branches and sub-branches, the branches reflecting the folder structure. Although the folder and sub-folder structure allows storing documents in a structured manner, it is often difficult to decide which would be the appropriate location for a document. As a consequence, a lot of time is often spent searching for documents stored on a hard disk of a computer.

Database systems often allow to tack additional information to the documents, like search terms. Also, assigning documents to predefined classes is common. However, there is always a compromise to be made. Limiting the number of classifications or search terms helps to maintain a certain degree of lucidity, but restricts the user in adding references. Providing greater freedom in entering search terms and classifications quickly ends up in a counterproductive tangle.

In the Internet, so called hyperlinks are widely used. A hyperlink contains the address of another document. If the user "follows" the hyperlink, the document located at the respective address can be accessed. However, it can still be a tedious exercise to find what one is searching for. One major reason is that the hyperlinks are not managed. A link may point from one document to any given other document, but at the target document, there is no information available about all the links that are pointing to this document. Especially, when the document is close to what the user is actually looking for, it would be desirable to know about all the hyperlinks pointing to that document and follow them "backwards" in order to find a document that either contains the desired information or has hyperlinks pointing to other matching documents.

But there is no such possibility. The only option to walk the way backwards that led to such a document is by using the capability of most Internet browsers of storing the addresses of the documents accessed within one session. So the "Back" button of the Internet browser can guide the user back to the document from where the link pointed to the recent document, not because such information is stored in the documents, but only because the browser remembers previous addresses.

Documents in a database are often administered in a hierarchical manner. Such hierarchical structures are typically visualized by using a tree structure. Such a tree structure shows a number of items, and each item may have an arbitrary number of sub-items. Several interrelated items will typically be grouped under a superordinate item. While the tree structure appropriately depicts the hierarchy of items, such a structure has other limitations: Each item has only one "parent" item, in other words only one link is pointing to each item. Due to this, only one path leads to a document. If the creator of the structure had a different understanding of a logical configuration than any given user, then that user may never find a desired piece of information.

A requirement managing tool named DOORS® (produced and distributed by Telelogic AB, Malmö, Sweden) allows organizing documents in a hierarchical manner. The hierarchy is visualized in a tree structure (similar to the Windows Explorer). Additionally, links can be generated pointing from an item to any other item. However, the link structure cannot be viewed in a lucid manner, and navigating along the links is a tedious exercise. Only one level of links can be viewed at a time. In other words, for each item only the links pointing directly to the item and pointing away from the item are displayed. Especially, when links have led to a fruitless location, reverting to a more promising junction is not supported. This type of navigation is very similar to exploring the content of a computer hard disk by using old DOS versions, where on each directory level, the DIR command would list the subdirectories, and one had to change to one of the subdirectories to be able to find out more about further subdirectories by again using the DIR command. This mode of navigation significantly lacks the efficiency and convenience provided for instance by a tree view display.

Relational databases allow creating a complex data structure, where tables or certain kind of data entries are referring to other tables or data entries in order to project a complex structure into a database. But such structure is predefined to contain information in a certain structure. The links are part of a predefined structure, not part of the information itself. Therefore it requires the skill-set of a database architect to build and maintain such complex database systems.

The exploding amount of information related to a certain subject tends to dilute the understanding of such subject. Even more, for a comprehensive understanding of a subject it is required to communicate the inherent structure between information items. It is not sufficient to list or summarize the information items itself. But such an inherent structure is often too complex to simply being projected to either one hierarchical tree or an anarchistic deployment of unilateral links. The thesis can be made that in a complex structure, a significant part of the information itself is contained in the structure or network of the information items.

A typical prior art visualization mode of items being interrelated by pointers is shown in FIG. 25. Although only 12 items are present and the number of pointers is only 16, the representation of the network is already confusing. If a data collection having thousands of items is presented to the user in this manner, it is a hard task to locate an item holding the information the user is looking for.

Accordingly, a need remains for an interface and a method allowing a user to intuitively explore a complex collection of data, and to navigate within the collection using references pointing from data items to other data items.

BRIEF SUMMARY OF THE INVENTION

A primary objective of the present invention is to provide an interface and a method, preferably embodied by a program executed on a computer, said interface allowing the user to intuitively explore a collection of data. Such a collection must consist of data items and references, the data items being interrelated with each other by references. Data items are discrete pieces of information. The interface makes use of the references to allow the user to comfortably navigate from a given data item to other related items.

References are pointing from one data item to another data item. The invention is most useful when being utilized on a data collection where the references are forming a network of interrelations between the data items. In such an environment, the data items can be regarded as a network of nodes being interrelated by pointers or references. For this reason, the term "nodes" is used in this disclosure when referring to data items of a data collection. A node can for instance be a row in a database table, or a term in a list of terms, for instance being delimited by semicolons. An electronic data file like an HTML document is also regarded as a node within the scope of this invention. Such a node may primarily serve as a label, or it can contain further information. It can have further data like an electronic document assigned to it, or it may only hold references to other nodes.

In a preferred embodiment, each node has a descriptive name. This name can for instance be stored in a field of a database table, or it can be defined as part of the information contained in the node. With HTML documents, the title as defined in the title tag could serve as a name. The data or documents that may be assigned to a node will be electronic files in a preferred embodiment. Identification of those documents can be achieved by storing the names in a field of a database table, or it can be merged into the other information contained in a node. In HTML documents, link tags are referencing external documents.

Documents can be text documents, images, video clips or any other kind of electronically storable data. However, a node could also hold a description of the location of a physical document like a CD or a book. In a fully computerized data collection, the documents would be available in electronic format. Once the user has selected a node, the interface would allow him/her to directly view the assigned document on the computer monitor, assuming respective access rights.

In a database system, information nodes would typically be numbered, each node carrying a unique identifier. The numbering does not have to be known or visible to the user. A reference in its simplest form consists only of two identifiers: The identifier of the node being the starting point of the reference, and the identifier of the node where the reference is pointing to.

References being assigned to a first node and pointing to a second node are referred to as "outgoing" references with respect to the first node and "incoming" references with respect to the second node. In a file system on a computer, an entry defining a subdirectory is regarded as an outgoing reference with respect to the parent directory and an incoming reference with respect to the subdirectory. In more general terms, an "incoming" reference with respect to a particular node is a reference that holds that node's identification. In case of a particular HTML document, an incoming reference is a link specifying the file name and, if applicable, the location of that particular document. If the document holding the link is also an HTML document, and both documents are located within one file system, the location may be defined as a relative location. If both documents are located in the same directory, only the filename is required.

The user interface according to the principles of this invention will present references pointing from any given node to other nodes in an intuitive graphical manner. Furthermore, the user interface allows the user to display not only the references pointing away from a given node to other nodes, but also all the references pointing to a given node from other nodes. Preferably, the user interface allows switching between both presentation modes in order to maintain good overview. For outgoing references, in a preferred embodiment the common tree view, as for instance used in the Windows Explorer, will be adequate, showing the nodes where the outgoing references of a certain node are pointing to as so called "child nodes" of the respective node. Child nodes are typically displayed one level below the respective node and with a certain indentation to the right. To visualize a plurality of incoming references to a certain node, a modified tree view will be implemented, allowing to assign as many "parent" nodes to any given node as incoming references are present. In one possible implementation, the user could select a particular node and then switch to a "Show Uplinks" mode, "Show Uplinks" being synonymous to "Show Incoming References". Then, the display would group all nodes having references pointing to the selected node above the selected node, with a certain indentation to the left, these nodes thus being displayed as "parent" nodes. In this view mode, each parent node can be expanded again, thus displaying all nodes that have references pointing to that parent node. In this way, the user can quickly obtain a comprehensive overview from which areas references are pointing to a particular node.

In another implementation, references can be filtered. It would be possible to assign references to pre-defined categories or user groups, and a subset of references could be visible for a special user group only. Furthermore, references may also be assigned to the creator. In this way, each user can set private references, not visible to other users.

In yet another implementation, the interface according to the principles of the present invention would be used to explore a collection of data where the data items (or nodes) are distributed over several data collections, each collection being identified with a unique identifier. Since each information node and each reference can carry its own unique identifier, there is no risk of confounding different items in different systems. In such a network, references could point to a node in another data collection by appending the data collection identifier to the node identifier. Navigation along such a reference structure being spread over several information management systems would best be supported by a centralized server, the server having knowledge of the location of each affiliated data collection. In this way, when following a reference to another data collection, the request would automatically be directed first to the server, and the server would forward the request to the appropriate data collection. This concept is similar to the domain name servers (DNS) in the Internet: When a user enters the name of a Web site, those servers forward the request to the physical address of the computer hosting the respective site.

In a preferred environment, the electronic documents assigned to nodes are stored in a file system on a computer that prevents direct access by the users and thus does not allow bypassing the interface as described in this disclosure.

BRIEF DESCRIPTION OF THE SEVERAL VIEWS OF THE DRAWING

FIG. 11 shows a tree structure after the execution of the "Show Downlinks" function according to FIG. 10.

FIG. 12 shows a tree structure with a center-element where the down-branch is expanded and the up-branch is collapsed.

FIG. 13 shows a tree structure with a center-node and all of its parent-nodes being fully expanded.

FIG. 14 shows Visual Basic code defining an internal data structure.

FIG. 15 shows the first row of an internal data structure according to FIG. 14.

FIG. 16 shows an internal data structure with three rows.

FIG. 17 shows an internal data structure with six rows.

FIG. 18 shows an internal data structure reflecting a tree structure as shown in FIG. 11.

FIG. 19 shows a display region as part of an interface, displaying a portion of a tree structure and a vertical and a horizontal slider allowing the user to select the portion of the tree to be viewed.

FIG. 20 shows a display region as part of an interface, displaying a tree structure directly after a "Show Uplinks" function has been executed. The center-element has not been relocated with respect to FIG. 19.

FIG. 21 shows the same tree structure as FIG. 20, but after the user has moved the tree into the upper left corner of the display area.

FIG. 23 shows a reference structure of a data collection, the reference structure being visualized by a combination of hierarchized elements and linear elements.

DETAILED DESCRIPTION OF THE INVENTION

Figure 1:
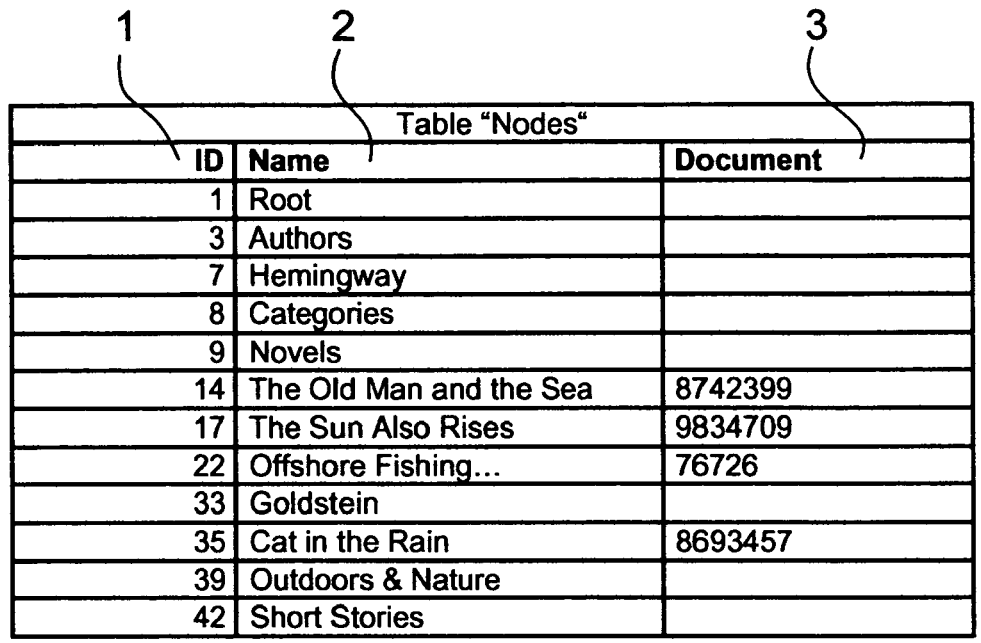
FIG. 1 illustrates a database table named "Nodes", listing nodes.

General Features of the Interface and Internal Data Structure

A data collection to be explored using the interface according to the principles of this invention incorporates two basic components: Nodes and references. Additionally, supplementary documents can be handled. The term "node", as used in the claims, is interpreted to mean a discrete piece of information, distinguishable from other pieces of information. The nodes of the data collection are associated with each other by references and may serve two purposes. Firstly, they can be a structural element, which means that a node has at least one reference pointing to the node, and at least one reference pointing away to another node. Secondly, they can hold additional information other that the name of the node. Thirdly, they can have one or more documents assigned. The information itself may be partially stored in the node, and partially in the document, or it can completely reside in the node or completely reside in the assigned document(s).

References are helping the user seeking for information to find respective documents or respective nodes. Although the term "link" is commonly used and understood, the term "reference" describes the nature of those pointers more precisely and is therefore generally used in this disclosure. A reference is a directional pointer between two nodes, since it can best be understood as pointing from a first node to a second node. The identification of the node where the reference is pointing to will typically be explicitly noted, while the identification of the node that the reference is assigned to can either be also explicitly noted, for instance in a field of a database table, or it can also be assigned to a node by being part of the information contained in the node. References can appear in a broad variety of representations and can be organized in many different manners. They could be stored in an electronic file like for instance so-called hyperlinks, as widely used in HTML documents. The address in this case is written in ASCII characters. A hyperlink contained in an HTML document is therefore assigned to the document where it is located, and the name and location of the document it is pointing at is explicitly noted as part of the link. The term "reference", as used in the claims, is interpreted to mean a piece of information which is assigned to a node and holds the identification of another node.

According to the meaning of the term "reference" in this disclosure, the file system on a computer hard disk is also organized by references. While to the user a sub-folder or sub-directory in the file system appears to be simply arranged "under" another folder, the file system internally provides a list for each folder, containing all files and sub-folders, and entries in the file allocation table (FAT) point to the actual location of the files and sub-folders on the hard disc. The way a file system is structured can therefore be regarded as a system of references. An entry defining a subdirectory is regarded as an outgoing reference with respect to the parent directory and an incoming reference with respect to the sub-directory. Another preferred method to manage references is storing them in a database table. A file card in a physical library, holding the shelf number of a book, could also be regarded as a reference. However, this invention is limited to a collection of electronic data and does not include physical references. A data collection to be explored by the interface described in this disclosure is therefore constituted by a plurality of nodes having interrelations defined by a plurality of references.

The interface provides one or more display regions to a user. At least one display region is used to visualize a structured view of the nodes and their interrelations. To allow for intuitive navigation from the user's perspective within the reference structure, each reference must have a direction. A reference that would simply state that it connects node A to node B would not be appropriate according to this invention. In one preferred embodiment, the interface is managing nodes stored in an electronic database system, more specifically on a SQL database. SQL is the abbreviation for "Structured Query Language" and describes a database where subsets of the data records that are stored within the database can be received by sending queries to the database, the query being assembled using the standardized terms and syntax of SQL. A SQL database holds record sets in tables. Each table may consist of several columns or fields. While the term "column" may be more illustrative when looking at a graphical representation of a table, the term "field" is typically used in SQL documentation and also in data structures reflecting results of SQL queries ("recordsets"), and is also used in this disclosure. In order to structure the data, certain fields of any given table may have relationships to fields of other tables.

Figure 2:
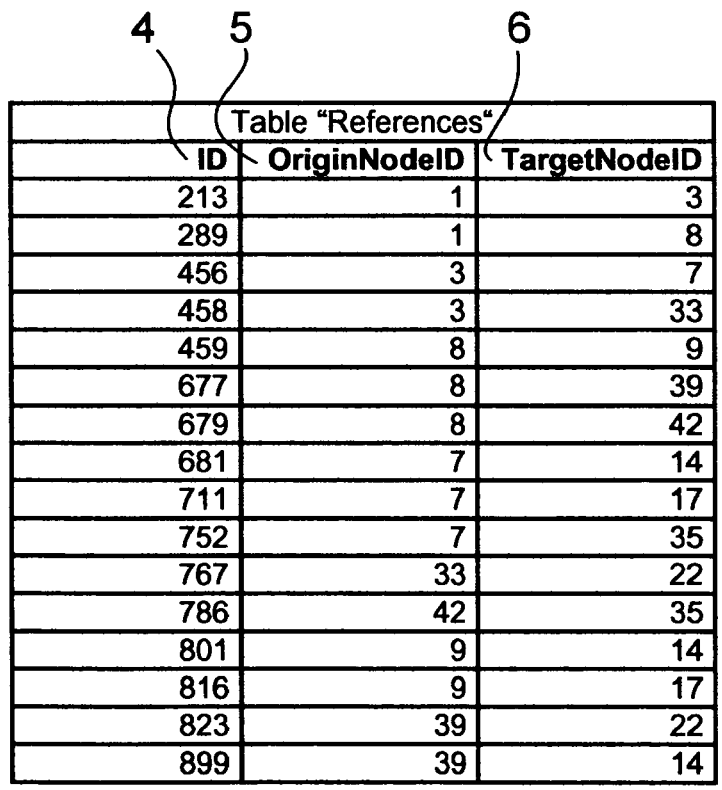
FIG. 2 illustrates a database table named "References", listing references.

To implement the basic functionality required for an interface according to the principles of this invention, two tables are required: One table holding the nodes, another one holding the references. A rudimentary implementation of a library system is used to demonstrate the capabilities of such a structure in conjunction with the interface. The entries in the exemplary data collection are reduced to a bare minimum for the sake of perspicuity. FIGS. 1 and 2 show two tables. Table "Nodes" in FIG. 1 holds twelve rows, each row reflecting a node. The first field 1 ("ID") holds the identifier of the node. In FIGS. 1 and 2, the identifiers are normal numbers. In a preferred embodiment, unique numbers will be used for each item. Today's database systems like Microsoft® Access provide a special number format named GUID or Replication ID. GUID is the abbreviation for "Globally Unique Identifier". GUIDs may for instance be generated by using the current date and time, the ID of the network adapter of a computer and a random number, making sure that the same GUID will never be generated again at any time on any computer. If the database provides GUID as number format, the GUID of each record can be created automatically by the database system when the record is created. GUIDs are typically 128-bit numbers. If visualized in hexadecimal format, they still consist of 32 characters, and are not very easy to grasp for a human. For this reason, all figures representing database tables in this specification will show normal numbers instead of GUIDs, although GUIDs are a preferred implementation for identifiers in this invention. Furthermore, numbers below 100 have been chosen as identifiers for table "Nodes", and numbers above 100 and below 1000 have been chosen as identifiers for table "References", in order to improve legibility.

The second field 2 ("Name") holds the text that is displayed to the user on a display region of the interface for each node. The third field 3 ("Document") holds the name of the electronic document assigned to the node. Depending on the specific implementation, the entries in the third field may additionally carry the file extension (like .doc, .jpeg), or a further field is reserved for the extension, in case the filename is a GUID.

Table "References" in FIG. 2 holds sixteen rows, each row reflecting a reference. The first field "ID" 4 holds the identifier of the reference. The number format of this field would preferably also be GUID, but for the sake of comprehensibility, normal numbers are used in FIG. 2. This applies also to the two following fields. Field "OriginNodeID" 5 references the origin of the reference, while field "TargetNodeID" 6 references the node where the reference is pointing to.

The first row in table "Nodes" holds the so-called root node with ID#1 (all identifiers are arbitrary). This node is a structural node and serves as origin for high level nodes, that typically will also serve as structural nodes and will have no documents assigned. The first two rows in table "References" are referencing this node (value 1 in field "OriginNodeID"). The first reference is pointing to the node with ID#3, named "Authors", the second one points to node #8, named "Categories". From node #3, two references are pointing to two further nodes: #7 named "Hemingway" and #33 named "Goldstein". From node #7, three references are pointing to three further nodes: #14 named "The Old Man and the Sea", #17 named "The Sun Also Rises" and #35 named "Cat in the Rain". In the same manner, all other references are pointing from one node to another.

Figure 3:
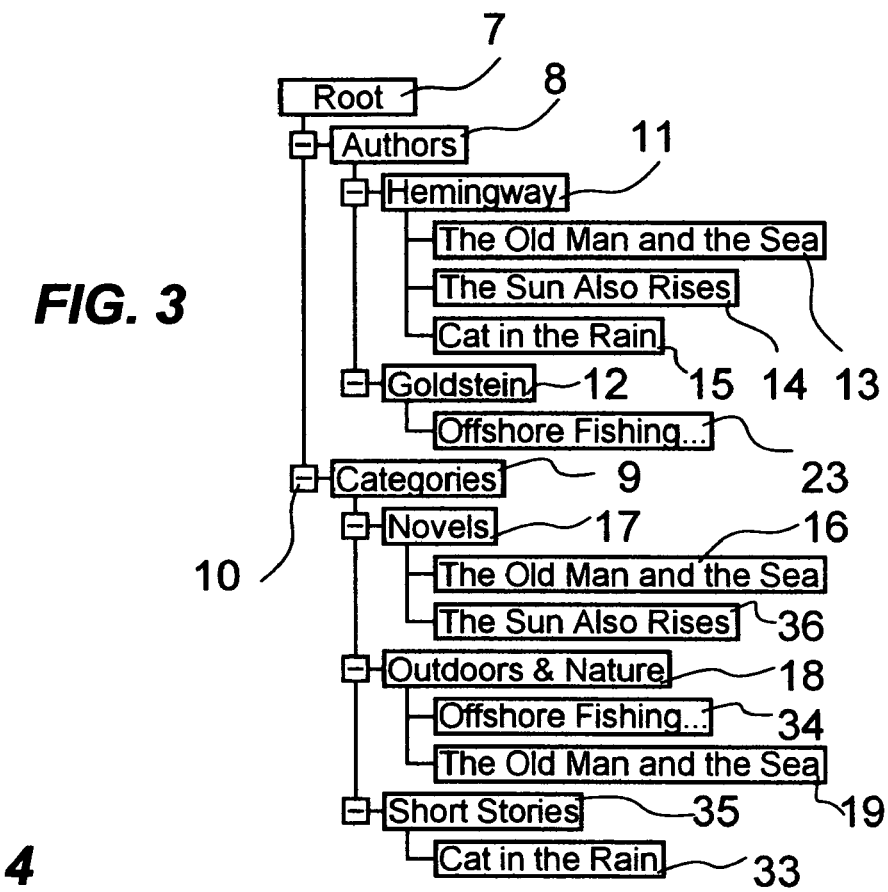
FIG. 3 shows a fully expanded tree structure, visualizing nodes and references.

FIG. 3 visualizes the nodes and references as defined in tables "Nodes" and "References" in a fully expanded tree structure. Although the fully expanded view may be confusing at first sight, and will hardly ever be used by a user seeking for information, it is helpful to understand how the reference structure is reflected in the tree view.

The topmost node 7 is named "Root" and reflects the node with ID#1 in table "Nodes". Below that node, as child nodes having an indentation to the right, two nodes 8 and 9 are arranged: "Authors" and "Categories", according to the two entries with IDs #3 and #8 in table "Nodes", which are assigned to Node ID#1 by references #213 and #289 in table "References". The collapse symbols 10 ("minus" sign) left of the nodes indicate that the branch is expanded, which means that all sub-items are displayed. If a branch is collapsed (not expanded), an expand symbol ("plus" sign) would appear, indicating that sub-items are present. A so-called "leaf node", that has no outgoing references, would have no sign at the left. A common way to expand or collapse branches in tree views is to click at the plus respectively minus sign.

Below node "Authors", two child nodes 11 and 12 are located: "Hemingway" and "Goldstein", reflecting entries #7 and #33 in table "Nodes". Below node "Hemingway", three child nodes 13, 14 and 15 are arranged, named "The Old Man and the Sea", "The Sun Also Rises" and "Cat in the Rain", reflecting nodes #14, #17 and #35, structured by references #681, #711 and #752. All other nodes in the tree can be derived from the database tables in the same manner. In this way, the tree structure reflects the information nodes in table "Nodes" and the references in table "References".

An interesting aspect is shown by node 16 "The Old Man and the Sea" as a child-node of node 17 "Novels". Node 17 is stored in table "Nodes" with ID #9. The reference with ID #801 points from the node with ID #9 (which is "Novels") to the node with ID #14 (which is "The Old Man and the Sea"). So both nodes 13 and 16 in FIG. 3 are reflecting the same node in table "Nodes" with ID #14. This is also true for node 19, being a child-node of "Outdoors & Nature", ID #39 in table "Nodes". Nodes 13, 16 and 19 do not just have the same name (like two different files in a computer file system could have the same names as long as they are located in different folders), but instead they reference exactly the same node in the database. The document #8742399 attached to that node would typically hold the text or an abstract of "The Old Man and the Sea". In a similar manner, node 14 ("The sun also rises") is identical to node 36, node 15 ("Cat in the rain") is identical to node 33, and node 23 ("Offshore Fishing") is identical to node 34.

Figure 4:
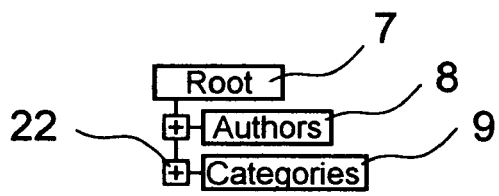
FIG. 4 shows a tree structure with only the root node expanded, showing the two child-nodes.
Figure 6:
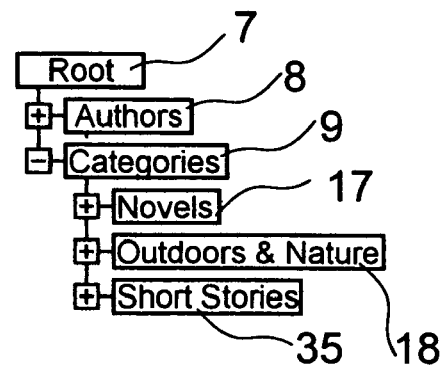
FIG. 6 shows a tree structure with the root node and one further level expanded.

There are several ways for a potential user to locate with the help of the interface for instance the document assigned to "The Old Man and the Sea". When the interface described in this disclosure is activated, only two child-nodes would typically be displayed as shown in FIG. 4: Node 8 "Authors" and node 9 "Categories". Note that instead of collapse symbols, expand symbols 22 are displayed, since both nodes allow for expansion, but are not yet expanded. If the user knows the author, he or she will expand node 8 and then expand node 11 "Hemingway", the tree then looking like FIG. 5. If the user does not know the author, he or she will expand node 9 "Categories". There, according to FIG. 6, the main categories "Novels" and "Short Stories" are listed, but additionally the high-level classification "Outdoors & Nature" (node 18) is present. Obviously, many more classifications would typically exist here. In this case, Hemingway's "The Old Man and the Sea" is located under "Novels" as well as under "Outdoors & Nature" (see FIG. 3). Many more useful sub categories having various references to the various books in the library could be set up.

Figure 5:
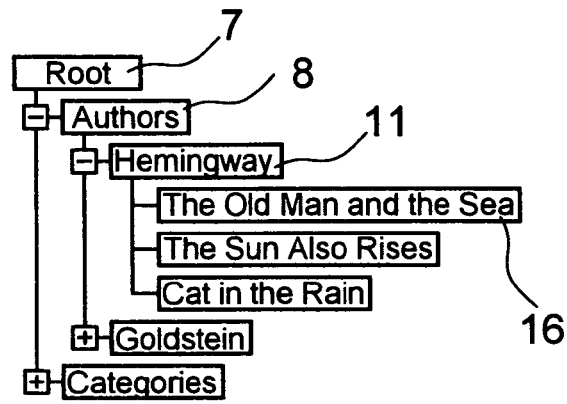
FIG. 5 shows a tree structure with the root node and two further levels expanded.
Figure 7:
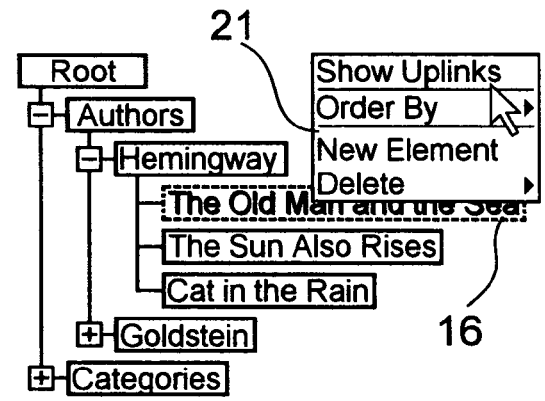
FIG. 7 shows a tree structure where one node has been selected and the "Show Uplinks" function is to be performed.

Another great benefit is the possibility to follow the references in the other direction. Assuming, a user has located Hemingway's "The Old Man and the Sea" as shown in FIG. 5, but he/she is looking not exactly for this item, but something similar. In this situation, the "Show Uplink" feature can be used (this term being synonymous to "show incoming references"). To use this feature, node 16 has to be selected. In a preferred embodiment, selection of a node will be achieved by locating the mouse pointer over the desired item and then clicking the left mouse button, and then the visualization of the respective node will slightly change. The text could for instance be displayed in bold letters, or could be highlighted, or the type of bordering line could change from solid to dash-lined. Many other implementations are also possible. In FIG. 7, the highlighted node 16 has bold text and a dash-lined border.

Figure 8:
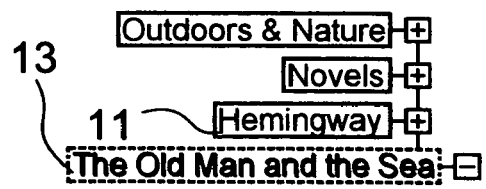
FIG. 8 shows a tree structure with a selected node (center-node) and its parent-nodes (up-branch).

After node 16 is selected, the "Show Uplink" feature is activated. In a preferred embodiment, this is done by locating the mouse pointer over the selected item and clicking the right mouse button. A small window 21 will appear, holding several menu items (a so-called pop-up menu), see FIG. 7. One menu item states "Show Uplinks". If the user clicks at this menu item, the window will disappear, and now all nodes that have references pointing to the selected node are displayed as parent nodes as shown in FIG. 8. This portion of the tree is named "up-branch" in this disclosure, while the originally selected node is called "center-element" and the portion of the tree below the center-element (if present) "down-branch". The main attribute of a typical center-element is that it has an up-branch structure above it and a down-branch structure below. Node 13 in FIG. 8 however is a leaf node and therefore has no down-branch below. As discussed later, a tree view can have multiple center-elements, each center-element joining an up-branch portion and a down-branch portion.

To point up that the up-branch is visualizing incoming references, a specific arrangement mode for the nodes different from the arrangement of a down-branch is used. In a preferred embodiment, the arrangement of the tree elements (expand/collapse symbols, nodes) of the up-branch is mirrored. The elements are aligned to the right border of the tree view instead of the left border as usual, and also the expand/collapse symbols are located at the right side of the nodes. In this way, it is apparent to the user that this portion of the tree above a particular node displays all the nodes that are pointing to that node (incoming references), which is substantially different to the common visualization mode of a tree view which can only show outgoing references (below a particular node all the nodes are displayed where that node is pointing to). FIG. 11 shows a center element having an up-branch above and a down-branch below and demonstrates that both arrangement modes can well be combined within one tree view.

Figure 9:
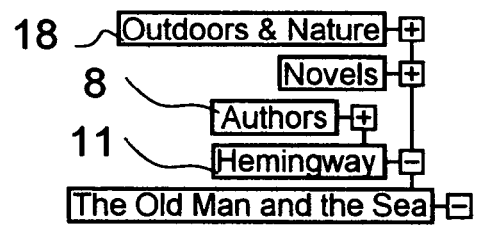
FIG. 9 shows a tree structure with a center-node and its parent-nodes (up-branch), one parent node being expanded.
Figure 10:
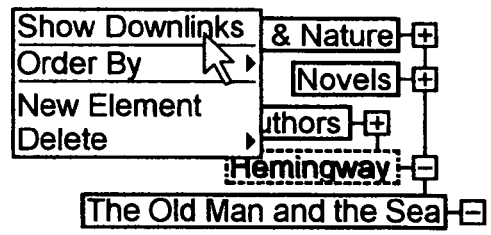
FIG. 10 shows a tree structure where a node within the up-branch is selected, and the "Show Downlinks" function is to be performed.

After having executed the "Show Uplinks" function on node 16, the user has several options. One option is to find out which nodes are pointing to "Hemingway". A click on the plus sign next to node 11 would expand this node and additionally show node 8 "Authors" (FIG. 9). If the user wants to look for other works by Hemingway instead, node 11 is to be selected. Then the "Show Downlinks" function can be activated (FIG. 10). "Show Downlinks" is synonymous to "show outgoing references". Now, basing on the references that point from node "Hemingway" to other nodes, these nodes are displayed as child-nodes of node 11 as shown in FIG. 11.

Another option instead of looking for works by Hemingway would be to select node 18 "Outdoors & Nature" in the configuration shown in FIG. 9 and to activate the "Show Downlinks" functionality. This would lead to a display as shown in FIG. 12. In this situation, the user might find node 23 "Offshore Fishing . . . " worthwhile to evaluate. By selecting this node, activating "Show Uplinks" and expanding all parent nodes, a tree view as shown in FIG. 13 would be presented to the user. So it becomes obvious even from this limited example that basing on the concept of references and the associated display concept according to the invention, each node offers a variety references to other useful pieces of information.

In a preferred embodiment, the database would be implemented as SQL server. A computer executing a program would embody the interface, the program being able to access the database. Another preferred embodiment is to run a remote server handling a database and providing a Web interface. Such a Web interface can be implemented using HTML and/or ASP technologies, and can be operated by a user with a standard Internet browser. It would also be possible to provide an ActiveX® (trademark of Microsoft Corporation) control embedded in a WEB page. Microsoft's NET technology provides various options like ASP.NET to develop interactive Web based applications. The present invention is not pertaining to a specific underlying technology.

A preferred development tool to create an interface that would be embodied in a program running on a local computer is Visual Basic® (produced and distributed by Microsoft Corp., Seattle, Wash., USA). This programming environment comprises components for convenient database access as well as many other useful components for a graphic user interface. However, other embodiments can successfully be created in many other development environments.

To display the data in a tree view as described above, the respective data has to be received from the database by the interface. This is done by generating SQL queries. The examples noted in this disclosure are using the "dialect" of Microsoft Access. To obtain root node 7, its ID must be known. The options to achieve this include but are not limited to defining the ID as a constant in the database or storing it in a separate table. The ID being 1 in our example, an appropriate SQL query to obtain the root node would be:

(SQL1) "SELECT ID, Name, Document FROM Nodes WHERE ID=1".

Such an SQL query returns a recordset, which is a number of records from the database having fields as defined in the query and matching the WHERE clause. In a preferred embodiment, the computer program would provide an internal data structure, reflecting the tree view. For this purpose, an array of a structured variable is defined. The structure of the variable reflects the fields of table "Nodes" and has additional information like the ID of the reference that is assigned to the entry and a flag stating if the respective node has sub-respectively parent nodes. In Visual Basic code, such a structured array variable named "uTreeRep" would be defined as shown in FIG. 14. The items forming a structured variable are referred to as "elements" in this disclosure.

FIG. 15 shows the exemplary content of such an array. The first column 24 named "Index" is not an element of the structured variable, but represents the index of the array. Element 25 "Ref_Ix" holds the index of the parent node (in the down-branch) respectively of the child node (in the up-branch). This number refers to the array index, not the ID in the database. Element 26 "Node_ID" holds the ID of the node as stored in database table "Nodes". Element 27 "Name" reflects the "Name" field of table "Nodes", and element 28 "Doc_ID" holds the ID of an assigned document as received from field "Document" in table "Nodes". Element 29 "UD" states if the reflected portion of the tree is part of the up-branch ("U"), down-branch ("D") or if it reflects the center-element ("C"). Element 30 "Ref_ID" holds the ID of the reference (field ID in table "References") that causes the appearance of the node at this portion of the tree. Element 31 "Refs" states if a node can be expanded, or in other words, if references are pointing to respectively away from the node. Within the down-branch, a value of 0 means that the node cannot be expanded, while a value of 1 means that the node can be expanded. Within the up-branch, a value of 0 means that the node cannot be expanded (applicable for the root node only), while a value of 2 means that the node can be expanded. For the center-element, a value of 1 indicates that it can be expanded only downwards (applicable for the root node only), a value of 2 indicates that it can be expanded only upwards, and a value of 3 indicates that it can be expanded downwards and upwards.

Element 32 "Level" stores the number of the respective hierarchical level. The root node receives 0 at the beginning. Each node being entered as a child-node under a certain node receives the level of the parent-node +1. Accordingly, in the up-branch portion of the tree, each new node being inserted as a parent node of a certain node receives the level of the child-node −1. The absolute number of the levels is not relevant, just the relative values.

Reading the root node into the data structure would create the first element of the array as displayed in FIG. 15: The values of elements 26, 27 and 28 are taken directly from the recordset returned by the SQL query. Element 25 receives a −1, since the root entry has no parent node. The portion of the tree reflected in this node is the down-branch by default, since the root element does not have any node above itself; accordingly element 29 receives a "D". Element 30 receives −1, since no reference is pointing to the root node. The value of element 31 is taken from a further SQL query as explained below. Element 32 "Level" receives value 0.

When data of a certain node is obtained from the database, in a preferred embodiment the interface is automatically looking for references pointing away from that node respectively towards that node. This is done because the display of the node needs to be equipped with an expand symbol in case continuative references exist.

To obtain references pointing away from a node, the following SQL command can be used:

(SQL2) "SELECT References.ID FROM Nodes INNER JOIN References ON (Nodes.ID=References.OriginNodeID) WHERE OriginNodeID=<Node_ID>" In this query, the term <Node_ID> has to be replaced with the value in element 26 "Node_ID" of the data structure. For the root node, this would be 1. In this case, the SQL server would return two recordsets, indicating that the root node has two references pointing to other nodes. Respectively, element 31 "Refs" receives value 1. FIG. 15 shows the completed first element of the internal data array.

If the user now desires to expand that node, the child-nodes have to be obtained and entered. An appropriate SQL query to be used in a preferred embodiment is:

(SQL3) "SELECT Nodes_1.ID, Nodes_1.Name, Nodes_1.Document, References.ID FROM (Nodes INNER JOIN References ON Nodes.ID=References.OriginNodeID) INNER JOIN Nodes AS Nodes_1 ON References.TargetNodeID=Nodes_1.ID WHERE OriginNodeID=<Node_ID>"

This query with <Node_ID> substituted by 1 would return two records with the following values:

(i) 3; Authors; <EMPTY>; 213

(ii) 8; Categories; <EMPTY>; 289

FIG. 16 shows how the data are entered into the internal data structure of the interface. Element 31 "Refs" receives the appropriate value from running (SQL2) again for each element of the data array, with <Node_ID> being substituted by 3 and 8. Since both nodes have references pointing to other nodes, value 1 is to be entered.

Further expansion of Node 9 "Categories" (equivalent to element with index (2) in the internal data structure) would require to run (SQL3) again, with <Node_ID> being substituted by 8. Three records are returned:

(i) 9; Novels; <EMPTY>; 459

(ii) 39; Outdoors & Nature; <EMPTY>; 677

(iii) 42; Short Stories, <EMPTY>; 679 and FIG. 17 shows how the data are entered into the internal data array.

If the "Show Uplinks" function is activated, new parent-nodes can for instance be obtained by the following SQL query:

(SQL4) "SELECT Nodes_1.ID, Nodes_1.Name, Nodes_1.Document, References.ID FROM (Nodes INNER JOIN References ON Nodes.ID=References.TargetNodeID) INNER JOIN Nodes AS Nodes_1 ON References.OriginNodeID=Nodes_1.ID WHERE TargetNodeID=<Node_ID>".

An adequate query looking for references pointing to newly entered nodes in the up-branch would be:

(SQL5) "SELECT References.ID FROM Nodes INNER JOIN References ON (Nodes.ID=References.TargetNodeID) WHERE TargetNodeID=<Node_ID>".

The internal data structure reflecting the configuration of FIG. 11 is shown in FIG. 18. The main purpose of the internal data structure is that it easily allows "painting" the tree view. If for instance Visual Basic is used as programming environment, a PictureBox can be placed on the GUI of the interface, and one by one each element of the internal data structure is written to the PictureBox. Text is written by using the "Print" command (for instance "pctTree.Print uTreeRep(0).Name"), and lines are drawn using the "Line" command (for instance "pctTree.Line (x1, y1)-(x1, y2)"). The vertical arrangement of the elements is preferably done on a line-by-line basis, while the horizontal arrangement is derived by using the "Level" element of the data structure in order to calculate the appropriate indent. Connecting lines between the boxes framing the text can also be drawn, as shown in the respective figures, and the expand/collapse symbols can either be drawn line by line, or they can be copied from an existing bitmap resource.

If the user clicks at the tree view respectively at the PictureBox, the mouse coordinates are made available to the program, and it can easily be calculated if the user has clicked at an expand/collapse symbol or a node. So a mouse click can lead to expanding/collapsing branches or to select a node. When expanding a branch, the new elements have to be obtained by sending an adequate SQL query (like SQL3 or SQL4) to the database. The new elements have to be inserted into the internal data structure below the node to be expanded, and the following respectively previous (in case of the up-branch portion) elements have to be shifted accordingly. Doing this, the values of element 25 "Ref_Ix" have to be adjusted if applicable since they may refer to a portion of the data array that has been shifted. When collapsing a branch, the simplest solution is to delete the respective elements from the data array. This can be achieved easily by making use of the "Level" element: All entries below (respectively above in case of the up-branch) the selected node are deleted until a "Level" value is reached that is equal or smaller (respectively greater in case of the up-branch) than the level assigned to the selected node. Again, the values in "Ref_Ix" may have to be adjusted accordingly.

If a click with the right mouse button is performed, also this becomes known to the program, and a respective pop up menu can be displayed. All this is strongly supported by Visual Basic. For somebody skilled in the art of programming and with some basic knowledge of SQL databases, no problem will be presented in creating an interface representing this invention. Some diligence is required if the interface is used in a multi-user environment. The programmer has to be aware that elements displayed on the computer monitor of one user may be deleted by another user shortly afterwards. Accordingly, when sending SQL queries to the database, appropriate error handling is required. Additionally, it may be useful to run a verification routine triggered by a timer for instance every 30 seconds over the internal data structure and detect if the current tree view reflects the latest state of the database.

Also, other useful features may be implemented. Since nodes can show up multiple times within one tree view, it would be helpful to the user that each time he/she selects a node, a program routine scans the internal data structure for duplicates of this node, and highlights these duplicates in the tree view.

Furthermore, it is desirable that the user can add new nodes, delete existing nodes, change the name of existing nodes, create new references and delete existing references in a convenient manner by operating the mouse within the tree view. This can be greatly supported by pop-up menus as already explained in the context of selecting the "Show Uplink" and "Show Downlink" functionality. Adding new nodes is performed by creating new entries in the database (in the "Nodes" table as well as in the "References" table) basing on the currently selected node that serves as a parent node for the new element. Preferably, the entry in table "Nodes" is performed first, since only the new ID number (respectively GUID) is known. Afterwards, the insertion into the internal data structure and the creation of an appropriate entry in table "References" can be executed. Deletion of existing nodes is performed by deleting the respective record from table "References". SQL database allow defining joins between tables that allow for automatic deletion of all elements in a joined table that are referencing an element to be deleted ("cascade delete"). Using this functionality, all respective references in table "References" would be deleted automatically. The relation between the records in table "Nodes" and the currently selected node is done by using element 26 "Node_ID" of the internal data structure, which holds the ID of the respective record. This is the case for all SQL queries.

It would certainly be helpful, if the look-and-feel of operating the tree view was similar to the tree views commonly used in many other programs. Changing the name of a node can be performed best using the so-called "Slow Double-Click" functionality known from other tree views: If the user selects a node and clicks at the same node again after for instance 2 seconds, the text becomes editable. The new name would then be entered into table "Nodes". Adding new references could be performed by "drag-and-drop". A drag-and-drop operation is performed by the user by clicking onto a symbol on the GUI (in this case a node being displayed in the tree view) with the help of a mouse or another pointing device (touch pads etc.) and dragging the symbol to another location on the GUI by operating the pointing device. During this drag operation, the mouse pointer typically changes its shape. When the symbol is dropped by releasing the pointing device, the drag-and-drop operation is completed, and depending on the context, the internal data being displayed on the GUI are changed accordingly. The term "drag-and-drop", as used in the claims, is interpreted to mean a user-driven operation on a GUI where a symbolic representation of data is selected, then moved across the GUI and placed at another location. Visual Basic strongly supports drag-and-drop operations by providing methods like "OLEDrag" and "OLEStartDrag" to start such an operation basing on mouse actions and by presenting events like "OLEDragOver" (for appropriately changing the style of the mouse pointer), and "OLEDragDrop" and "OLECompleteDrag" (for triggering the internal data changes).

A new entry in table "References" is created by using the mouse coordinates of the drag-and-drop operation. The ID of the node where the drag operation was started is temporarily stored in a variable. The node where the drop operation was performed serves as "OriginNodeID". When the drag-and-drop operation is completed, the ID stored in the variable serves as "TargetNodeID". An appropriate SQL command adds a new record to table "References", using the IDs of the nodes where drag-start and drop were performed. Deleting existing references is performed preferably via pop-up menu. If the user decides to delete the reference from the selected node to the parent node, the value of element 30 "Ref_ID" of the internal data array is used to achieve the ID of the reference in table "References". Before performing a "Delete Reference" operation, the interface should seek for other references pointing to the selected node, and in case that no other references are found, the user should be warned that after deletion of the reference, the node itself will not be accessible any more since the reference to be deleted is the only one attaching the current node to all other nodes. After all operations changing the content of the internal data structure are processed, a redraw operation on the tree view has to be performed.

Many other useful features can be implemented. In a preferred embodiment, the order in which the child-nodes are arranged can be selected by the user. Assuming that in addition to the name of a node, the date when the node was created (or changed) and the name (or ID) of the creator is stored in table "Nodes", it is possible to order the elements accordingly as desired by the user. This SQL query would return child-nodes in the order of the creation date (it is assumed that this field is named "DateCreated" in the database table), the newest one being displayed at the top:

(SQL6) "SELECT Nodes_1.ID, Nodes_1.Name, Nodes_1.Document, References.ID FROM (Nodes INNER JOIN References ON Nodes.ID=References.TargetNodeID) INNER JOIN Nodes AS Nodes_1 ON References.OriginNodeID=Nodes_1.ID WHERE TargetNodeID=<Node_ID>ORDER BY Nodes_1.DateCreated DESC".

Each time when the "Show Uplinks" respectively "Show Downlinks" functionality is performed, significant portions of the tree structure will disappear. If for instance node 33 "Cat in the Rain" in FIG. 3 is selected and "Show Uplinks" is performed, all that remains is node 33 as center-element and two parent-nodes named "Short Stories" and "Hemingway". Although this allows the user to appropriately seek for desired information, it may be slightly confusing especially when the user is not very focused on what he/she is doing. A favorable feature would be a "Back" button 39 and a "Next" button 40, see FIG. 19, similar to what most Internet browser provide. In a preferred embodiment, the internal data structure would be copied each time when a user selects "Show Uplinks" or "Show Downlinks". A predefined number of copies (for instance 20) would be maintained during the program session, and if the user clicks at the "Back" button, the most recent copy would be activated, displaying the tree as it looked before the last "Show Uplinks" or "Show Downlinks" action. If the "Back" button is clicked multiple times, then the respective previous copies would be activated. The user can then, using the "Next" button and thus activating more recent copies, reconstruct how the current state was reached. Depending on the available main memory of the computer, all copies of the tree structure created during the program session could also be maintained. Another option would be to create a copy of the tree structure each time a node is expanded or collapsed. Also, the index of the currently selected element could be copied together with the data structure, so when the "Back"/"Next" button is clicked, the respective selected element could be displayed in a highlighted manner.

Another aspect is how the nodes are to be arranged after a "Show Uplinks" or "Show Downlinks" action. In FIG. 3, node 15 "Cat in the Rain" is for instance displayed in the 6th line. If either element is selected, and "Show Uplinks" is performed, only three lines remain. In a preferred embodiment, the center-element "Cat in the Rain" would remain at its previous location, thus leaving a significant void area side at the left and the top (see FIG. 20). However, this void space is well understandable to the user.

In order to reduce the size of the void area, another helpful feature is implemented in a preferred embodiment. Since the tree structure may become very large, the available display area on the GUI may not be large enough to show all elements of the tree. In this case, so-called slider controls are typically introduced. FIG. 19 shows an exemplary tree view having a vertical slider 37 and a horizontal slider 38. FIG. 20 shows the tree structure after having executed "Show Uplinks" for node 15 "Cat in the rain". Now, if the user drags the horizontal slider 38 to the right, this leads the tree view to be moved to the left. The visible void area to the left is thus decreased. Internally, the software also eliminates the invisible void area.

Accordingly, the length of the slider increases, since the overall width of the tree area is reduced relatively to the visible area. Once the user has moved the tree completely to the left, there is no more void area on the left, neither visible nor invisible. Accordingly the length of the slider has been increased to the maximum, indicating that there exists no more hidden tree portion in horizontal direction. The same applies to the vertical arrangement. The result is shown in FIG. 21.

Figure 22:
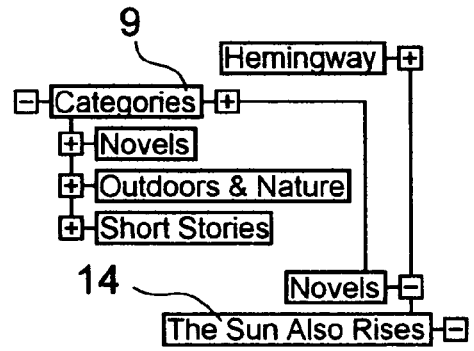
FIG. 22 shows a tree structure having two center-elements.

In yet another implementation, the number of center-elements is not limited. As shown in FIG. 22, nodes 14 ("The Sun also Rises") and 9 ("Categories") are center-elements. Although serving as center-element, node 14 is not expandable to the bottom, since it is a leaf node (it has no references pointing to other nodes). Node 9 is not expanded to the top, but could be (it has node 7 "Root" pointing to it).

From FIG. 22, it becomes obvious that the horizontal arrangement of the elements may become difficult when multiple center-elements are used, and the branches of the center-elements are expanded to a significant level or have long names. In yet another embodiment, two or more tree views are used. The left view, for instance, would represent the down-branch starting at the root node. The right view would show the up-branch of the node that is currently selected in the left view. In another implementation, the user would have to explicitly demand the right view to synchronize with the left view. It would also be possible to synchronize the left view with the right one: If the user selects any node on the right view, the left tree view could display the down-branch of that node. Accordingly, the display region of the interface displaying the structured view of the nodes and their interrelations can consist of more than one component. The arrangement of the components is not predetermined by this invention. Possible arrangements include but are not limited to horizontal arrangements, vertical arrangements and superposition.

If a new reference has to be created by a drag-and-drop action, and the tree structure is very large, so that the first node where the drag operation is to be started and the second node where the drop operation is to be performed are not both visible within the available display area at the same time, it is also helpful to have two tree structures. The drag-and-drop operation would be started at one tree view showing the first node, and be completed at the other tree view showing the second node.

In another preferred embodiment, a tree view can be temporarily separated into two views by using a splitter bar. This feature is well known from software like Microsoft Word and is very useful to independently orient two parts of the same tree in an appropriate manner to perform a drag-and-drop operation. Alternatively, two menu items could be added to the pop-up menu showing up when a node is right-clicked with the mouse. One menu item could for instance state "Start link", the other one "Drop link".

Figure 24:
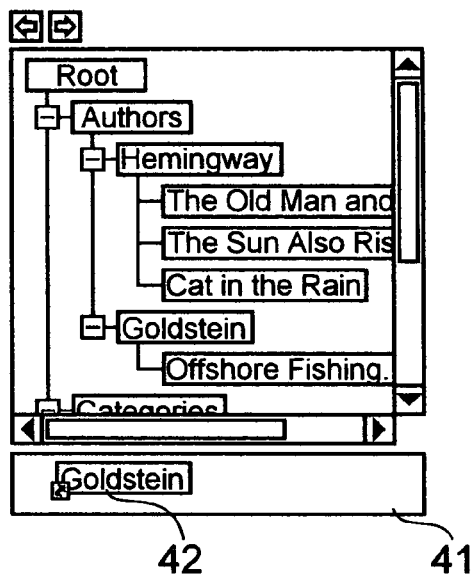
FIG. 24 shows a display region as part of an interface comprising a tree view and a holding area, and a symbol currently being placed onto the holding area by "drag-and-drop".
Figure 26:
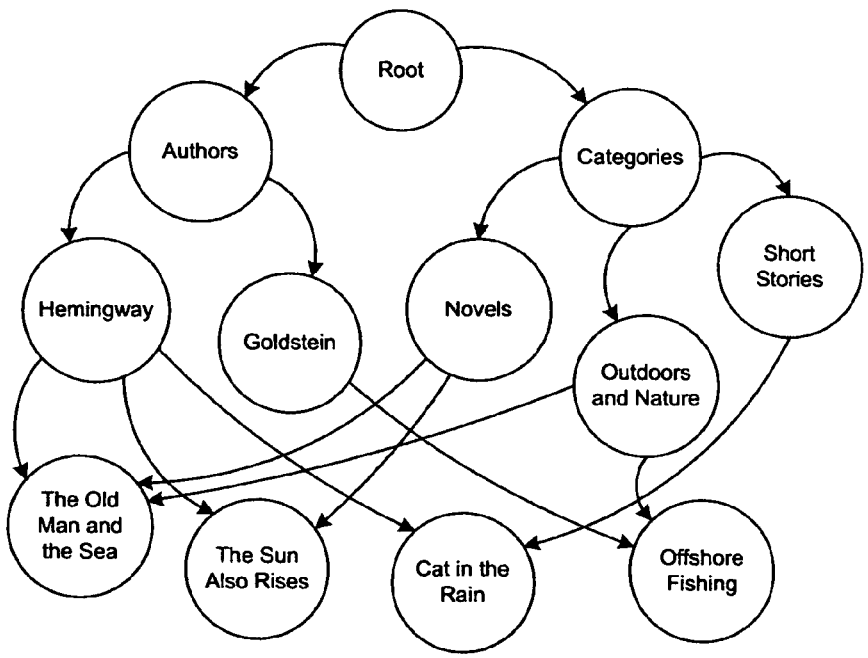
FIG. 26 shows a prior art visualization of 12 nodes being interrelated by references.

In another preferred embodiment of the present invention, a portion of the GUI would be reserved for temporarily placing a symbol being dragged. The drag-and-drop operation would be suspended by dragging the symbol onto the reserved space, the user can then scroll the tree view until the desired target area is displayed, and then would continue the drag-and-drop operation by clicking onto the symbol currently being placed at the holding area and dragging it over the target. FIG. 24 illustrates a holding area 41 below a tree view, and a symbol 42 currently being placed at this holding area by drag-and-drop. The big advantage of this functionality is that the user can always see which symbol is currently subject of a suspended drag-and-drop operation. Other solutions that are commonly used in tree views like selecting an item, copying the item into the clipboard and pasting it from the clipboard at the desired target have the great disadvantage that the user cannot intuitively determine what is currently placed in the clipboard. If he/she accidentally performs another copy-to-clipboard operation before pasting the originally desired item at the target, the last copied item will erroneously be pasted instead. Therefore, the functionality of a holding area as described above would be very useful for many other applications as well.

Within the scope of this disclosure, one possible implementation would work as follows: The user clicks at node and starts dragging the mouse. The MouseMove event is used to trigger the OLEStartDrag method, which stores the ID of the node being dragged in a variable. When the mouse cursor is dragged over the holding area and released, the OLEDragDrop event of the control representing the holding area (preferably another picture box) will be fired, and this event initiates a function that paints the node onto the holding area, preferably using the same mechanism as used for painting the nodes at the tree view. To illustrate that not an independent node is present, but rather a representation of a node belonging to the tree structure, an additional symbol may be added like the little curved arrow as shown in FIG. 24 at the lower left corner of the node. Now, the drag operation is suspended. The user can scroll the tree view, and expand or collapse branches. When the node representing the desired drop target is visible, the user clicks at the node representation located at the holding area and drags it onto the node representing the drop target. The beginning of the drag operation is handled in the same manner like described above for drag-and-drop operations within the tree, using the "OLEStartDrag" event of the picture box representing the holding area, and is completed by "OLEDragDrop" and "OLECompleteDrag" events of the tree view control. Since the ID of the node being subject of the operation was stored in a variable, the completion of the operation is done just as if the drag-and-drop operation had not been suspended.

More useful enhancements of the holding area can easily be created. It would for instance be possible to let the holding area serve as a container for multiple node representations. A user planning for instance to reference many nodes to a newly created node could locate the nodes one after another and drag them onto the holding area. After she/he has collected all desired nodes, the newly created node has to be located, and a single drag-and-drop operation onto this node could assign all nodes being present in the holding area as sub-nodes of the new node. Instead of having a single variable for storing the ID of the node where the drag operation started, the program code requires to provide an array of GUID variables for multiple drag starts. When the drop operation has been performed, instead of creating one new record in table "References", as many records as IDs are present in the array are created. It is obvious that this feature greatly improves the efficiency of operating the interface, and minimizes the risk of errors resulting from accidentally dropping a link onto an undesired target due to confusion from the user's side when maneuvering inside large tree structures.

In another preferred embodiment, another arrangement mode, being a derivative of a classical tree structure, is used. Assuming that a data collection holds information on movies, a possible implementation would be to have a node named after the respective movie, and for each movie have sub-nodes named "Actors", "Director", "Story", "Background" etc. Below the "Actors" nodes, further sub-nodes would hold the names of the actors. If a user selects a node representing an actor, and executes the "Show Uplinks" functionality, many parent-nodes named "Actors" will appear, depending on the number of movies where this actor had a role. The user will have to expand each "Actors" node, in order to see the names of the movies. If a node has only one incoming reference (like each of the "Actors" nodes), it would be helpful to display the parent-node of this node by default, and it could also be displayed in the same alignment as the child-node. FIG. 23 shows a possible implementation. This implementation makes obvious that a classical tree is only one option to display the interrelations of nodes. Other arrangement modes are also possible, and in order to enable the present invention, the only requirement for the GUI of the interface is that it can show references in both directions, and in more than one level of interrelations for each direction, providing appropriate arrangement modes for each direction. Preferably, the number of levels to be displayed is more than ten. The term "level of interrelations", as used in the claims, is interpreted to mean a step from one node to another node when following a reference. The possible arrangement modes in order to visualize these levels include but are not limited to a vertical arrangement with indentations like commonly used in tree structures or horizontal arrangements as demonstrated in FIG. 23. The term "level of interrelations" as used in the claims emphasizes that the number of levels between two nodes, which is the number of steps taken when following references from one node to another node is not necessarily a fixed number. Since references can be created in an unrestricted manner, it would be possible to have a reference pointing from node A to node B, another reference pointing from node A to node C, and a third reference pointing from node B to node C. The number of levels between node A and C is therefore one, when following directly the reference from node A to node B, and is two when following the reference from node A to node B and from there to node C.

When the interface is launched, it is possible to have a default root node serving as a starting point as explained further above. This is, however, not necessary. Other mechanisms like search algorithms can be implemented allowing a user to define the starting point. Especially when exploring HTML documents, the arbitrary selection of a root node will be helpful. This will be discussed further below.

To anybody skilled in the art it will become obvious that the features of the GUI as discussed above are only exemplary. Many other useful implementations are possible.

Full Text Search

Storing the nodes as records in a database allows for several useful functions in order to locate desired elements. Navigating along the references is one option. If the name or a part of the name of a node is known, then an SQL query can be run in order to receive all nodes that match the search term. If for instance the term "old" is to be part of the name, an appropriate query would be:

(SQL7) "SELECT ID, Name FROM Nodes WHERE LCASE (Name) LIKE LCASE ('*old*')".

This query would return the two nodes "The Old Man and the Sea" and "Goldstein". There are several options how to present these results to the user. One option would be to display each node in a tree view as center-element with parent-node(s) and sub-node(s), if applicable. In other words, as many tree views as records have been returned would be shown. Another option would be to present a simple list of the matching results first and have the user select the favorite one. It is important to understand that one name can be assigned to many different nodes. While in the sample database as shown in FIG. 1, each node has a unique name, the database feeding the tree view as shown in FIG. 23 would have many independent nodes named "Actors". Therefore, each independent node named "Actors" would have to be displayed individually as center-element at the tree view. The individual trees could be displayed one above each other, or the user could switch from one search result to the next by using buttons similar to the "Back"/"Next" buttons that have already been discussed further above. Other useful implementations can also be developed by somebody skilled in the art.

Another option is to search for nodes that have been created (or modified) within a certain time slot. This SQL query would return nodes that have been created between Aug. 7, 2002, and Sep. 1, 2002: (it is assumed that the respective field is named "DateCreated" in the database table):

(SQL8) "SELECT ID, Name, DateCreated FROM Nodes WHERE DateCreated >=#2002-08-07 00:00:00# AND DateCreated <#2002-09-01 23:59:59#".

A further option would be to look for nodes that have been created (or modified) by a certain person. This requires that the person that creates or modifies data is also noted in the recordset. Depending on the nature of data additionally present in the "Nodes" table, many other search functions can be presented to the user. It is also possible to combine clauses. For instance it may be useful to look for nodes that have been modified by a certain person within a certain time slot.

Documents Assigned to a Node

One characteristic feature of an interface according to this invention is the possibility to view a document assigned to a node. Although the term "document" is widely used and understood for electronic data stored in files on a computer system, the more general term "data" is used in the claims, since the interface does not require data to be present in a specific format, like a file on a computer system. Documents may include but are not limited to electronic files stored on a computer system, portions of such files, portions of a data stream and digital data received from a database.

There are several ways how the document may be defined internally. In a preferred environment, the electronic file has received a GUID as file name, and this GUID is stored in the record of the node as shown in FIG. 1. To avoid locating a huge number of documents in one folder on the file system of a hard disk, sub-folders can be used. The path of the sub-folder could then be stored in the "Nodes" table. Sub-folders can also be created automatically by the interface if for instance a sub-folder for each month according to the day of creation of the respective node is created. The sub-folders could then be named like "2003-05". Basing on the internal data of the creation date of the node, the interface could automatically assemble the path where the document is located. In a preferred embodiment, the normal users would have no direct access to the folders via the GUI of the operating system (for instance the Microsoft Windows Explorer), so they cannot unintentionally delete documents that are assigned to nodes.

Figure 25:
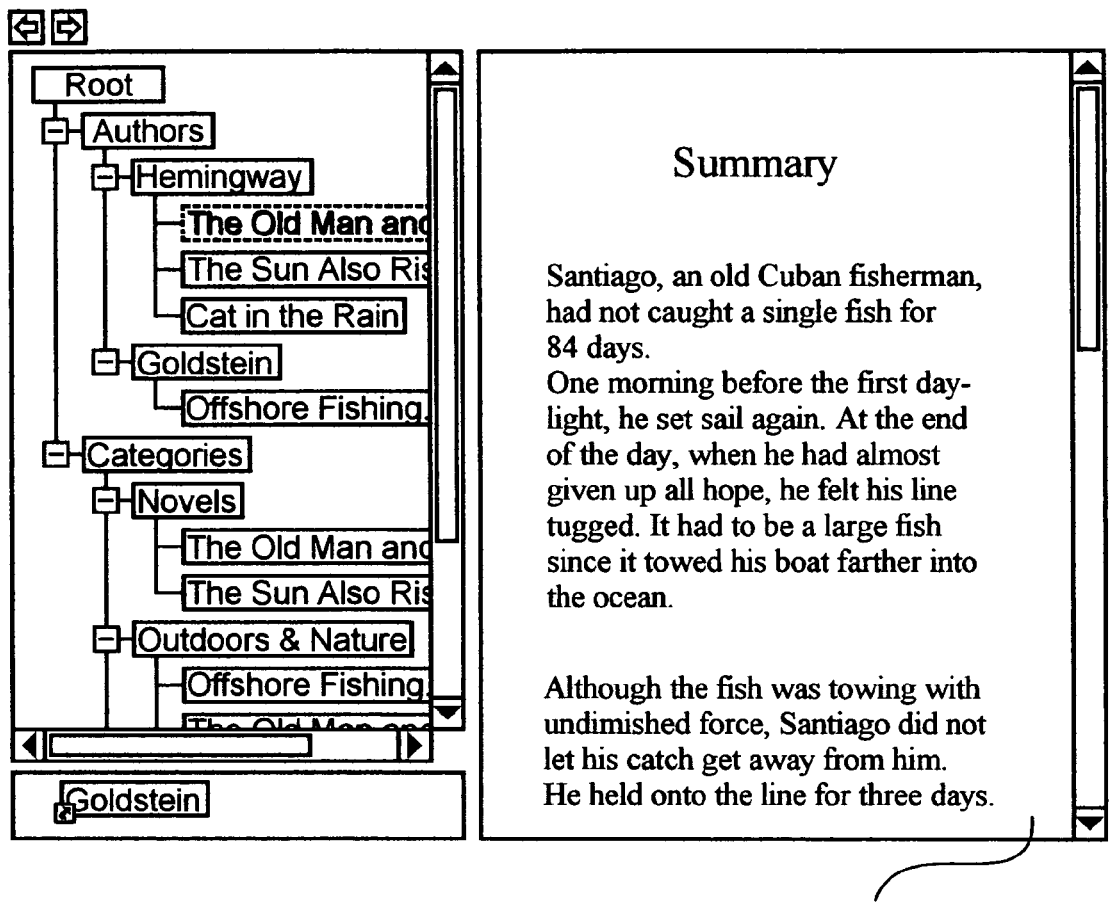
FIG. 25 shows a display region as part of an interface comprising a tree view, a holding area and a textbox control for displaying the content of assigned text documents.

The interface can offer several possibilities to the user to access the document that is assigned to a node. One solution would be to reserve a large portion of the interface's GUI for direct display of the document. If the interface is programmed in Visual Basic, a large textbox or a "RichTextBox" would be placed onto the main form as shown in FIG. 25. This control could display files holding text. To enable this, a variable would receive the document's name and path. Assuming that the documents are stored in sub-folders named according to the month of the node's creation date, and the creation date of each node is stored in a field named "DateCreated", and the file extension is stored in a separate field named "Ext", an SQL query like this one could be run:

(SQL9) "SELECT DateCreated, Document, Ext FROM Nodes WHERE ID=<Node_ID>", the term <Node-ID> being replaced by the ID of the currently selected node. Field "DateCreated" of the resulting recordset would be stored in a variable. Then, year and month would be extracted. If the name of the variable holding the creation date would be "DocPath" (of type Variant), an appropriate Visual Basic (VB) command would be:

(VB1) DocPath=Year(DocPath) & "-" & Month(DocPath) & "\".

Then, field "Document" of the resulting recordset would be added to variable "DocPath" by running command:

(VB2) DocPath=DocPath & rs!Document assuming that rs is the variable holding the resulting recordset of SQL9. To add the file extension, this command can be used:

(VB3) DocPath=DocPath & "." & rs!Ext

The three commands (VB1 ... 3) can also be merged into one command.

Since in this example only the sub-folder has been determined by extracting year and month from the creation date, the path needs to be completed by a command like:

(VB4) DocPath="C:\Assigned_Files\" & DocPath where the suffix added to the variable reflects the location of the root folder of the documents assigned to the nodes of the data collection. Obviously, there is no need to have these documents stored on a local disk of the computer running a program embodying the interface. Rather, the documents can be stored on a network server or even on a server accessed via Internet.

By running a further Visual Basic command like:

(VB5) rtfDoc.LoadFile DocPath the RichTextBox control named "rtfDoc" would display the content of the assigned file, provided that it is a valid RTF file. If another file format is present, another control of the GUI has to be used. For image files, a PictureBox control is appropriate.

In a preferable embodiment, multiple controls being able to handle different file formats are part of the GUID. In order to not waste space, all controls are of the same size, and have the same location. Only the control that is able to load the assigned document is switched to "visible", all other controls are hidden. The appropriate selection can be made via a "Select Case" switch in the interface software, making use of the "Ext" field in table "Nodes".

If no appropriate control is available, it is also possible to open directly the application assigned to the respective file format by the operating system. In a Windows environment, the API function "ShellExecute" can be used. In Visual Basic, this can be implemented by declaring the API function in the following manner:

(VB6) "Declare Function ShellExecute Lib "shell32.dll" Alias "ShellExecuteA" (ByVal hwnd As Long, ByVal lpOperation As String, ByVal lpFile As String, ByVal lpParameters As String, ByVal lpDirectory As String, ByVal nShowCmd As Long) As Long"

and calling the function by a command like:

(VB7) "ShellExecute(Me.hwnd, "open", DocPath, " ", " ", SW_MAXIMIZE)".

If the associated file was for instance a PDF file, the Acrobats Reader (produced and distributed by Adobe® Systems Inc., San Jose, Calif., USA) would then be launched by Windows, provided that it is installed on the computer. Alternatively, the interface can also specify internally the application to be launched. In VB, the "Shell" command can be used to launch a specific application.

It depends on the specific implementation if the assigned document is automatically opened when the user clicks at a node, or if a specific action is requested from the user, which would be preferable if the files are located on a remote site with a low bandwidth connection.

SQL Queries Assigned to Nodes

Another kind of documents assigned to a node could be an SQL query. Since SQL queries are text strings, the document format is preferably be ASCII. A file extension like "QRY" could indicate that the file holds an SQL query. Depending on the specific implementation, the SQL query could be directed to the database of the current data collection, or it could also be directed to any other database, if the database is specified and accessible. One option would be to specify the database also in the document that holds the SQL query. To display the results of the query, a control like "DBGrid" can be used. This control is also delivered with the Visual Basic development environment. A DBGrid control can display recordsets in a flexible table format. It can be bound to a "Data" control (also delivered with Visual Basic), and the data control can access databases by using only a few lines of code:

(VB8) "Set db=OpenDatabase(sDbPath)" and (VB9) "Set Data.Recordset=db.OpenRecordset(sSQL, dbOpenSnapshot)"

will cause the Data control to send the result of the SQL query stored in "sSQL" to the DBGrid control (variable "db" must be of type "Database", and sSQL is a string variable).

Integrity of Information

An interface being connected to an Information Management System as described in this disclosure may well be used as a requirement managing tool. System requirements can be entered, and when an implementation is designed, the elements of the function breakdown structure (FBS) are linked to the system requirements. Test cases are the linked to the FBS. A test case covering multiple FBS entries will have incoming references from each of these entries. In this way, documenting the verification and validation of a complex system can be performed with the help of the interface. In order to do so, it is essential that information items can only be changed by a well-defined group of users, depending on the state of development of the system. While during the design phase, all members of the design group may be allowed to add, modify and delete data in the FBS, this is not allowed any more when testing activities have started. This can be supported in many ways by the interface and the underlying data structure of a data collection. Assuming the data collection would be a database according to the previous descriptions, one option is to add fields to the "Nodes" table and also to the "References" table that have joins to other tables holding user groups. Each user has to belong to at least one user group, and if a user attempts to modify data, the system runs a query to make sure that at least one group to which the user belongs has the rights to perform such changes. The same applies to adding new nodes as child-nodes or erasing nodes. Identification of users may be done by providing login screens as commonly used in many computer programs.

If the visibility of a document or a node is restricted to certain user groups, they would be hidden from other users. There are many possible implementations of access rights. A commonly used method is to embrace a number of users in a user's group. Each user receives an ID (numerical value, text string etc.), and each user group lists the IDs of its members. This kind of information can for instance also be stored in database tables. One table would list the names and IDs of the user groups; another table would list the IDs of the user groups in one field and the IDs of the members in another field. The creator or owner of a node or the assigned document can then select one or more user groups that are allowed to view or edit his data. One possible implementation is to have a separate table in the database, holding the ID of the node in one field and the ID of a user group in another field. If more than one user group shall have the right to view or edit the node information, multiple records are added to the table. If the table would have an additional field defining the nature of access (read only, read-and-write etc.), then the owner could define certain groups that may only view a document, while other groups could also edit the document. If a node is to be expanded, an SQL query according to SQL3 would be directed to the database. Instead of displaying all nodes returned by the recordset, for each record of the recordset a new SQL query would be generated, returning all records in the table holding the IDs of the nodes and the IDs of user groups that would match the current Node ID. In yet another query, all members belonging to the respective user groups obtained by the previous query would be listed. In this way, a list of all users having permission to view and/or edit the node is compiled. Then, the interface checks if the ID of the current user is part of this list. If not, the node will not be displayed or the assigned document will be hidden.

A useful option to track changes is to add two fields to each node and/or reference, holding the date/time ("timestamp") of the beginning and the end of the validity period of each record. If a new record is created, the beginning of the validity period is the date/time of creation, and the end of the validity period could for instance be set to Dec. 31, 9999. If a user attempts to change data, a copy of the record is created. This copy receives the timestamp of the change as the end of validity, while the actual record receives the timestamp of the change as the beginning of validity. The end of the validity period remains unchanged. If the current view of the data collection is requested (which will typically be the case), the interface will equip all SQL queries with the WHEN clause: "(AND) EndDate=#9999-12-31#". If the status of the database on Jul. 1, 1999 at noon shall be displayed, all SQL queries have to be equipped with the WHEN clause: "(AND) BeginDate<#1999-07-01 12:00:00# AND EndDate>#1999-07-01 12:00:00#".

Another important aspect is the integrity of the documents that are assigned to nodes. The database could store the ID of the creator (or the ID of a respective user group) in the Nodes table and also for instance fields holding flags stating if the document is ready to be published or still in work. The interface could be equipped with checkboxes indicating if a document is finished and/or if it may already be viewed by users outside the person or group identified as owner. Changes of respective checkmarks would only be saved to the database if the creator of the node (or a member of the respective user group) has been identified as current user.

If a portion of a documentation system basing on this invention is to be baselined, all respective nodes and references would receive a flag that they cannot be altered or deleted any more by any user. The assigned documents could be converted into PDF documents (a file format provided by Adobe) and electronically signed.

Server Concept

The benefits of an interface being connected to a data collection as disclosed above can be greatly amplified by placing the database and also the assigned documents on servers that are accessible to many users. These servers could be connected to the Internet. Since a user would not necessarily know about the internet addresses of databases according to the invention, it would be possible to set up a central server that serves as a gateway. On this server, a database could be located that has no documents assigned to any of its nodes, but provides only a sophisticated structure of references where the leafs are pointing to nodes in other databases. Since all references are managed in databases, it can be assured that no "dead references" exist.

The central server could also be user for billing issues. Many internet services are restricted to subscribers. However, somebody looking for a certain article in a medical journal does not necessarily want to subscribe for a year. The publishing house of such a journal could assign each article in each issue to a node in the data collection. Parent node of each node could be a node that has the abstract assigned to it. Access to the "abstract"-nodes could be granted to everybody for free. If a user wants to have access to the full article, he would have to be a member of a specific user group. If the user is registered with his/her credit card number at the central server, he/she could be instantaneously placed onto such a user group after accepting a certain amount of money to be billed to their credit card. The great advantage of this concept is that the user needs to register only once at the central server. He/she can define limits for monthly expenses, and would receive an invoice with all items listed. Depending on the frequency of using a certain provider, a user can still subscribe a service in order to get a better pricing. This concept has special benefits for non-commercial information providers. A doctor who wants to publish about a special subject could add his document to the database of a university he is cooperating with, and would let the central server know how much he wants to bill. The company running the central server would charge the credit card of the users looking at the document, and retain a certain percentage of the fee for its own benefit. Such a concept has great advantages over currently offered services like PubMed, where for normal users only the abstracts of articles are accessible, but there is often no convenient way to quickly get hold of the complete article.

Exploring HTML Documents

While the interface as described in this disclosure is most useful when connected to a database, it can also handle a collection of HTML documents in the same efficient manner. In this case, the HTML files are serving as nodes. HTML files typically have a title defined as a title tag within the document. This title could for instance be displayed as caption of the respective node when a tree view is used. Since HTML documents have a well defined structure, a simple algorithm can parse the source text of such a document and look for sequences like "<title>" and "</title>", which enclose the actual title of the document. In Visual Basic, the function InStr(StringToBeSearched, SearchTerm) returns the position of the first character of the search term within the string to be searched, which is the source text of the HTML file. If the length of the search term, for instance 7 in case of search term "<title>", is added to this number, the first position of the title string is determined. The first position of the terminating string "</title>" tells the length of the title string. Using a Visual Basic command like (VB10) sTitle=Mid(sHtmlSource, iTitleStart, iTitleLength), the title string will be extracted from string variable "sHtmlSource" into string variable "sTitle", basing on the start position "iTitleStart" of the title string and the length "iTitleLength" of the string.

In HTML documents, the references are included within the document as so-called hyperlinks. A hyperlink pointing to the Patent's Main Page of the USPTO WEB site would look like:

<a href="http://www.uspto.gov/main/patents.htm">USPTO Patent Main Page</a>, the string "USPTO Patent Main Page" being an arbitrary text typically displayed to the user instead of the link itself.

Hyperlinks can reference any kind of electronic file. In a preferred embodiment of this invention, hyperlinks to other HTML documents are serving as references according to the scope of this invention, while hyperlinks pointing to other file types are serving as links to assigned documents. The presence of hyperlinks is determined in the same manner as described above for the title string. In this case, the search term "<a href=" has to be used, the address of the link being enclosed in quotation marks. Parsing an HTML document in this manner, all references to other HTML documents (nodes) can be extracted.

If a tree structure is used as display element of the interface, and the user clicks at the "Expand" symbol of a node, the interface would extract the titles of all HTML documents referenced in that node, and display the titles as captions of the sub nodes. Generating a down-branch in this manner is simple. Generating an up-branch requires more efforts, since each HTML document contains only the outgoing references, but no incoming references. In order to generate up-branches, all documents within a collection of HTML files have to be parsed by the interface to extract references pointing to a certain HTML document. To avoid unsuitable delays, this parsing process will favorably not be performed each time an "Expand" symbol is clicked at the interface. In a preferred embodiment, this process will rather be performed frequently in the background, and the results will be stored in an appropriate data structure. This could be a temporary internal data structure of the interface program, or it could be an external database. In case many users are working on the same data collection, it would be preferable to have a stand-alone collection of references, for instance stored in a database, and an independent software process frequently scanning the collection of documents and updating the collection of references. The interface program would in this case not parse the HTML documents, but would connect to the reference collection. This process would be very similar to obtaining reference data from the "References" table as explained further above. Such a method could even be performed on HTML documents placed on computers connected to the Internet. The Internet search engine Google® (operated by Google® Inc., Mountain View, Calif., USA) for instance is continuously scanning HTML pages and other documents like PDF and DOC in the Internet and is analyzing the links in order to create a relevance value for each document visited by the search engine. Web pages that are referenced by many other pages are considered more relevant than pages that are scarcely referenced. A reference or a hyperlink on another Web page that is pointing to a specific document is an incoming link with respect to that document. If Google would store all detected references or hyperlinks in a database, the interface of the present invention could make use of this data collection and allow the user to navigate within HTML documents of interest. Since some Web pages have a high number of incoming links, the additional features of the interface like full text search will be of great value to the user.

As mentioned before, hyperlinks in HTML documents may also be pointing to documents like image files, video files, sound files etc. Also, PDF files are often used as a container for text and graphics. Additionally, an image file can be referenced in a manner that the image is to be displayed to the user embedded in the text. These files are defined by the inline image tag "<IMG", followed by at least the "SRC" attribute stating the file name and location. In a preferred embodiment, the interface will provide a display region that shows the contents of an HTML document in a manner similar to typical browsers like Microsoft's Internet Explorer. In other words, the text elements and inline images will be displayed in a formatted manner. References to non-HTML files are regarded as references to assigned documents. If the interface is provided with controls that are able to handle the respective file format, the content of such a document can be displayed directly within a display region of the interface. Alternatively, the application registered for the respective file format by the operating system will be launched directly, or another application specified by the interface. This will also be the case if no control is present within the interface that can handle the respective file format.

It has been mentioned before that the interface requires having a node as a starting point in order to obtain incoming and outgoing references. This node can be a pre-defined node that is always used when the interface is launched. If a confined collection of HTML documents is to be explored, this will be adequate. When working on a very large collection, other methods of defining a starting point can be used. One option is the full-text-search explained further above. Another option would be to provide the interface with a classical file-open dialog. The user could then pick any desired file from the accessible file system. A further option is to pass the name of a file to the application when the interface is launched. Windows provides this possibility. If a user double-clicks at a file shown at the Windows Explorer, the operating system selects the application registered for the respective file type by analyzing the file extension, then launches that application and passes the name of the file to be opened to the application. In Visual Basic, the file name can be obtained by using the "Command" function which returns the file name and path as provided by Windows. If for instance the program representing the interface would be registered by the operating system for extensions HTM and HTML, then the interface would launch automatically if a HTML file is double-clicked, and the respective file would be used as starting point for the structured view.

Further Data Collections

From the examples presented in this disclosure, it becomes obvious that the interface will be useful for exploring many different kinds of data collections. As an alternative or a supplement to a database, HTML documents are just one example of a data collection that is not organized in a database format. A file format named XML can be regarded as a hybrid. XML documents are ASCII text documents like HTML files, but they can be structured in a very stringent manner and are widely used to export, transfer and import data between databases. XML documents could also serve as a stand-alone data collection within the scope of this invention. It is also obvious, that the data collection being explored by the interface can be a combination of one or more databases and stand-alone documents like HTML files. Additionally, a plurality of nodes can be defined within one electronic document. For instance, a simple ASCII based format could be used where nodes and/or references are listed in separate lines, the nature of each element being defined for instance by a tag at the beginning of the line. Many other implementations are also possible.

Another useful utilization of the present invention would be to display the relations between tables in a complex SQL database. While Microsoft Access for instance provides a graphical overview of the relations by displaying the tables with their fields and drawing lines connecting the fields having relations, this overview can quickly become confusing if a significant number of relations are present. It would be a simple task to interpret the fields of the tables as nodes, and the relations to other fields as references. A node representing a field that is referenced by another field would have an incoming link. For this and similar applications, it could be useful to introduce different types of references. Such references would not only have a direction, but would also belong to group of reference types. One type of references could for instance represent the assignment of a field to a table. Each table would then be present as a node, its child nodes representing the fields. Another type of references would represent the relations between fields. Since in SQL different types of relations are possible (1:1, 1:n, n:n) with different attributes (with or without referential integrity, cascade delete, cascade update), these characteristics could be represented by the reference type. This could be accomplished by adding another piece of information to the reference data. If the references are stored in a table in a database, like shown in FIG. 2, an additional field that could for instance be named "Type" could be added. In the display region of the interface, the representation of the references could be displayed as different line types (dashed, dotted, varying thicknesses etc.), or the lines could receive permanent tags or labels, or little windows popping up when the mouse is hovering over a line (so-called "tool tips") could show information about the type of a reference.

Different types of references can also be useful in other applications, where they could for instance indicate the relevance of a link (e.g. high, normal and low importance).

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements.

It must be understood that the illustrated embodiment has been set forth only for the purposes of example and that it should not be taken as limiting the invention. It will be apparent to those skilled in the art that alterations, other embodiments, improvements, details and uses can be made consistent with the letter and spirit of the foregoing disclosure and within the scope of the invention's patent application, which is limited only by the following claims, construed in accordance with the patent law, including the doctrine of equivalents.

We claim:

1. An electronic interface being displayed on a display device to permit a user to explore a collection of data, the collection including multiple records and multiple directional references between the records, the electronic interface comprising:
   a display region visualizing a first plurality of records of multiple records by having a first plurality of visual indicia positioned in a nodal arrangement being displayed on the display region, each visual indicia of the first plurality of visual indicia being related to and representing a record of the first plurality of records, each record of the first plurality of records having at least one of the following: a directional reference of a first direction to another record of the multiple of records and a directional reference of a second direction to another record of the multiple records, the second direction being different from the first direction;
   a first control element assigned to a first visual indicia of the first plurality of visual indicia and being responsive to a user of the electronic interface, the first visual indicia being related to and representing a first record of the first plurality of records so that when the first control element operates a second plurality of visual indicia insert into the nodal arrangement and display on the display region in close vicinity to the first visual indicia, the second plurality of visual indicia being related to and representing a second plurality of records of the multiple records, each record of the second plurality of records having a directional reference of the first direction to the first record; and
   a second control element assigned to a second visual indicia of the second plurality of visual indicia and being responsive to a user of the electronic interface, the second visual indicia being related to and representing a second record of the second plurality of records so that when the second control element operates a third plurality of visual indicia insert into the nodal arrangement and display on the display region in close vicinity to the second visual indicia, the third plurality of visual indicia being related to and representing a third plurality of records of the multiple records, each record of the third plurality of records having a directional reference of the second direction to the second record, and a third visual indicia of the third plurality of visual indicia being related to and representing a third record of the third plurality of records, the third record being the first record and the third visual indicia being displayed spaced apart from the first visual indicia.

2. An electronic interface as defined in claim 1, wherein the first and the second control element are each respectively displayed on the display region.

3. An electronic interface as defined in claim 2, wherein the first and the second control element each are operable by a user responsive to a user clicking at the respective control element with the help of a computer mouse.

4. An electronic interface as defined in claim 2, wherein the first and the second control element each are permanently displayed on the display region.

5. An electronic interface as defined in claim 2, wherein the first control element is displayed in close vicinity to the first visual indicia on the display region.

6. An electronic interface as defined in claim 2, wherein the second control element is displayed in close vicinity of the second visual indicia on the display region when the first control element operates responsive to the user.

7. An electronic interface as defined in claim 1, wherein the nodal arrangement includes a visualization of directional references between the records related to and represented by the first, the second and the third plurality of visual indicia when the first and the second control element operate responsive to a user.

8. An electronic interface as defined in claim 1, wherein after the user has operated the first and the second control element, and the user operates the second control element a second time, the third plurality of visual indicia is removed from the nodal arrangement being displayed on the display region to the effect that the third plurality of visual indicia is no longer displayed on the display region.

9. An electronic interface as defined in claim 1, wherein, after the user has operated the first and the second control element, and the user operates the first control element a second time, the second and the third plurality of visual indicia are removed from the nodal arrangement being displayed on the display region to the effect that the second and the third plurality of visual indicia are no longer displayed on the display region.

10. An electronic interface as defined in claim 1, wherein the nodal arrangement is displayed as follows when the first and the second control element operate responsive to a user:
    each visual indicia of the first, second and third plurality of indicia including a label to indicate a content of each record related to and represented by each such visual indicia;
    the visual indicia of the first, second and third plurality of indicia being arranged with respect to each other so that the second plurality of visual indicia is displayed on the display region below the first visual indicia and being offset therefrom and the third plurality of visual indicia is displayed on the display region above the second visual indicia and being offset therefrom.

11. An electronic interface as defined in claim 10, wherein references are made in the nodal arrangement displayed on the display region between the first visual indicia and the second plurality of visual indicia and between the second visual indicia and the third plurality of visual indicia by displaying one or more of the following: dotted and solid connecting indicia.

12. An electronic interface as defined in claim 1, wherein each record of the first, second and third plurality of records include one or more of the following:
    a database record of a plurality of database records,
    an identifier of a database record of a plurality of identifiers of database records,
    a data file of a plurality of data files,
    a name of a data file of a plurality of names of data files,
    an identifier of a data file of a plurality of identifiers of data files,
    a reference to a data file of a plurality of references to data files,
    a binary large object of a plurality of binary large objects,
    a name of a binary large object of a plurality of names of binary large objects,
    an identifier of a binary large object of a plurality of identifiers of binary large objects,
    a reference to a binary large object of a plurality of references to binary large objects,
    a website of a plurality of websites, and
    a reference to a website of a plurality of references to one or more websites.

13. An electronic interface as defined in claim 12, wherein the electronic interface includes a display region visualizing at least partially the content of one or more of the following:

a database record of the plurality of database records,
a data file of the plurality of data files,
a binary large object of the plurality of binary large objects, and
a website of the plurality of one or more websites.

14. An electronic interface as defined in claim 1, wherein at least one record of the first, second and third plurality of records includes one or more of the following:
a database query of a plurality of database queries,
a name of a database query of a plurality of names of database queries,
an identifier of a database query of a plurality of identifiers of database queries, and
a reference to a database query of a plurality of references to database queries.

15. An electronic interface as defined in claim 14, wherein the interface includes a display region visualizing at least partially the query result of a database query of said database queries.

16. An electronic interface as defined in claim 1, wherein the visual indicia representing the same record are highlighted, indicating that all occurrences of such visual indicia are related to and representing the same record.

17. A computer implemented method for generating an application user interface window used by an executing application program on a computer permitting a user to explore a collection of data including multiple records and multiple directional references between records, the interface window comprising:
generating a display in a display region to visualize a plurality of records of a collection and directional references of the plurality of records by positioning visual indicia in a nodal arrangement, each visual indicia being related to and representing a record;
operating one or more control elements being assigned to the visual indicia responsive to a user of the interface window, the one or more control elements being associated to one of the directions of the directional references between the records so that:
when a control element assigned to a first visual indicia is operated, a first plurality of visual indicia is inserted into the nodal arrangement and arranged in close vicinity to the first visual indicia, the first plurality of visual indicia representing records having a directional reference of a first direction to the record related to the first visual indicia;
when a second control element assigned to a second visual indicia of the newly inserted first plurality of visual indicia is operated, the second control element is associated to a second direction different from the first direction of references, a second plurality of visual indicia is inserted into the nodal arrangement and arranged in close vicinity to the second visual indicia, and a third visual indicia of the second plurality of visual indicia represents the same record which is represented by first visual indicia, the third visual indicia being displayed spaced apart from the first visual indicia.

18. An electronic interface as defined in claim 17, wherein the one or more control elements each are displayed in the display region.

19. An electronic interface as defined in claim 18, wherein the one or more control elements each are operated by clicking at the element with use of a computer mouse.

20. An electronic interface as defined in claim 18, wherein the one or more control elements are permanently displayed in the display region.

21. A method as defined in claim 17, wherein the nodal arrangement of the visual indicia is displayed as follows:
the visual indicia representing the records of the collection of data are displayed as rectangular boxes, the boxes being labeled to indicate to a user of the interface an identity of a related record;
the visual indicia are arranged with respect to each other so that
visual indicia representing a first record that has incoming references from a second record will be placed below the visual indicia representing the second record and being offset therefrom; and
visual indicia representing a third record that has outgoing references to a fourth record will be placed above the visual indicia representing the fourth record and being offset therefrom.

22. A method as defined in claim 17, wherein the nodal arrangement includes a visualization of directional references between the records represented by the visual indicia.

23. A method as defined in claim 17, wherein multiple spaced-apart visual indicia representing the same record are marked, indicating that all occurrences are representing the same record.

24. A computer program product comprising a computer useable medium having computer program logic recorded thereon for enabling a processor in a computer system to perform at least one of the methods of claim 1 to 23.

* * * * *